March 6, 1928.  H. W. HYDE  1,661,428

SPRING SUSPENSION FOR VEHICLES

Filed Aug. 24, 1923

Inventor:
Henry Webb Hyde,
By MacLeod, Calver, Copeland & Dike.
Attorney.

Patented Mar. 6, 1928.

1,661,428

UNITED STATES PATENT OFFICE.

HENRY WEBB HYDE, OF NORTH COHASSET, MASSACHUSETTS, ASSIGNOR TO HYDE ENGINEERING COMPANY, OF BOSTON, MASSACHUSETTS, A CORPORATION OF MASSACHUSETTS.

SPRING SUSPENSION FOR VEHICLES.

Application filed August 24, 1923. Serial No. 659,096.

This invention relates to vehicle spring suspensions of the general type shown and described in my prior Letters Patent No. 1,524,437, dated January 27, 1925.

As explained in said prior patents, the invention therein shown consists primarily in providing the vehicle with longitudinal springs or spring reaches connected at their ends, either directly or indirectly, with the axles, and in supporting the body on the spring reaches intermediate the ends of the latter in such manner as to permit said body to rock freely, with respect to and independently of the reaches, upon a horizontal, transverse axis, so that tilting or rocking of the reaches, caused by a vertical movement of either the front or rear wheels and the axle carried thereby, will not be transmitted to the body and will not tend to tip or pitch the same, said body being permitted, by rocking about its axis with respect to the reaches, to maintain its substantially horizontal position, its only movement being a slight vertical one in a substantially rectilinear direction.

In my prior patent aforesaid is described a spring suspension wherein the pivotal or rocking connection between the body and the reaches is located at one side of the center of gravity of the body toward one end of the latter, balancing springs being employed at the end of the vehicle at the opposite side of the center of gravity, whereby upward movement of the axle at said last-named end results in the application to the body of upward forces at opposite sides of the center of gravity, the moments of which forces are so balanced as to prevent rotation or pitching of the body. In another application, filed May 28, 1923, Serial No. 641,933, is shown a construction wherein upward movement of the axle at the opposite end of the vehicle is also accompanied by the application of balanced upward forces to the body at both ends, so that said body is held against pitching under the influence of upward shocks received by either axle and the consequent rocking of the reaches in either direction. In still another application, filed April 23, 1924, Serial No. 708,430, is shown a form of spring suspension of the same general type, employing balancing springs which are connected at both ends with the body so as to support the same at points intermediate the rocking connection and the ends and thereby further stabilize the same, the supporting forces applied by said balancing springs being, however, relatively small and sufficient only to compensate for eccentric loading of the body so as not to interfere with the free rocking movement thereof with respect to the reaches under shock.

The present invention has for its object to provide a form of spring suspension of this general type, which combines the advantages of the forms above referred to and in addition permits the use of the so called Hotchkiss drive which is so largely employed in automotive engineering at the present time, and which necessitates a connection between the spring suspension and the body of such a character as to take the drive and torque from the rear axle.

This and other objects of the invention, together with means whereby the latter may be carried into effect, will best be understood from the following description of one form or embodiment thereof illustrated in the accompanying drawings. It is to be understood, however, that the particular construction described and shown has been chosen for illustrative purposes merely, and that the invention, as defined by the claims hereunto appended, may be otherwise embodied without departure from its spirit and scope.

Figure 1:
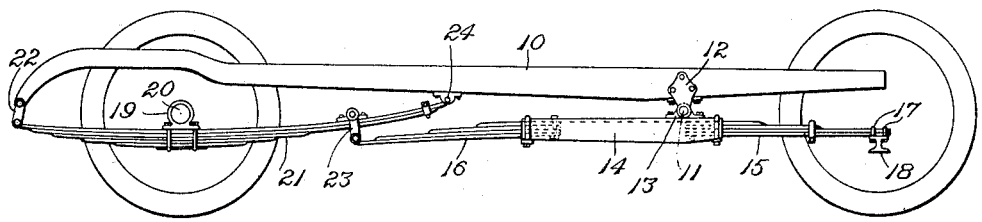
Fig. 1 is a side elevation of a suspension constructed in accordance with the invention.
Figure 2:
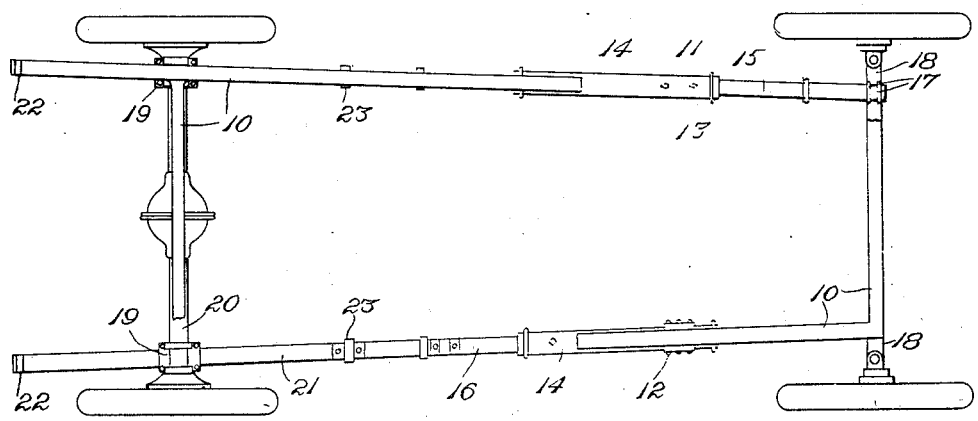
Fig. 2 is a plan view thereof, the chassis, or body-supporting frame, hereinafter referred to as the body frame, being partly broken away in order to show the parts of the suspension beneath the same.

The drawings show a pair of spring reaches to which the body frame 10 is connected by means of coaxial pivots 11 interposed between brackets 12 and 13 secured to said frame and reaches, respectively, the axis of said pivots being disposed forward of the center of gravity of the body, and the forward end of the body being free. Each of the spring reaches is composed of a substantially rigid beam 14 having leaf spring extensions 15 and 16 at the forward and rear ends respectively. The forward spring extensions 15 are secured at their forward ends, as by U-bolts 17, to the front axle 18 of the vehicle. Supported intermediate their ends by hangers 19 from the rear axle 20 of the vehicle are substantially semi-elliptical springs 21 connected at their outer or rear ends by shackles 22 with the rear end of the body frame 10. At the inner or forward side of the axle 20 the springs 21 are connected by shackles 23 with the rear ends of the rear spring extensions 16 of the respective spring reaches, the connections 22 and 23 being substantially equidistant from the axle 20. The leaves of the spring 21 are symmetrically graduated on opposite sides of the axle 20, in accordance with normal practice, but at the front ends of said springs the upper or main leaf, and, if desired, the second leaf also are extended beyond the shackles 23 and are pivotally connected at their ends, as shown at 24, to the body frame 10 substantially at or slightly in the rear of the center of gravity of the latter. These relatively light extensions of the springs 21, act as balancing or stabilizing springs for varying loads in the tonneau, and also take the drive and torque from the rear axle, in accordance with the well-known principle of the Hotchkiss drive.

It will be seen that when the rear axle is raised, upward forces will be applied to the body at opposite sides of the center of gravity thereof through the pivots 11 and shackles 22, respectively, the moments of these forces being balanced so as not to rock the body, as more fully explained in Letters Patent No. 1,524,437, above referred to. It will also be seen that when the front axle is raised, the forward end of the body will be lifted by the pivots 11, the rear ends of the reaches being at the same time swung downwardly about said pivots, thereby through the springs 21 acting as levers fulcrumed on the axles 20, exerting an upward force upon the rear end of the body, also tending to prevent pitching thereof, as more fully explained in application Serial No. 641,933. It will furthermore be seen that the connection 24 between the springs 21 and the body frame 10, which connection is between the pivotal axis 11 and the rear end of the body, serves further to stabilize the body as in application Serial No. 708,430. The pivotal connection 24 being substantially at the center of gravity of the body, forces transmitted to said body therethrough do not tend to pitch or rotate the body, or if said connection be in the rear of the center of gravity, the parts will be so designed that the moments of the forces transmitted to the body at the points 11, 22 and 24 are substantially balanced about the center of gravity. By reason of the connections 23 between the forward portions of the springs 21 and the rear ends of the rear spring extensions 16 of the spring reaches, the latter tend to exert a downward pressure reaction against the former when either axle is raised. The pressure or reaction is transmitted, in the form of a downward force, to the body at the point 24, said force tending to resist upward movement of the body in the vertical, rectilinear direction in which the lifting forces are transmitted thereto, so that shocks are absorbed to an increased degree by the resilient portions of the suspension, and the movements of the body are further reduced.

This can be seen by considering where the resultant forces act on the body, and their relation to each other. Thus, when the front wheel is raised, due to encountering an obstruction, the spring reaches turn about the axis of the pivots 11, causing a relatively strong vertical force at this point. The rear end of the reaches have a downward tendency at the shackles 23. This force is absorbed by the springs 21, the major portion being a downward force on the rear axle, and a very minor portion being a downward force at the connection 24. This is relatively small, for the reason that the springs 21 are proportionately very much more flexible between the shackles 23 and connections 24 than in the other parts of said springs. This is deliberately accomplished by stopping the normal gradation of the leaves at the shackles 23, and only carrying through one or two leaves to produce a stabilizing effect for varying loads in the tonneau, there being, as referred to above, a strong downward force at 23, and the elliptic springs being able to turn about the axis of the rear axle, there is a resulting upward force on the body at 22. Accordingly, to summarize the results of these forces, we have a relatively great vertical force at 11, at a moderate distance from the center of gravity, a relatively small downward force at 24 very close to the center of gravity, and a relatively medium upward force at 22 at the maximum distance from the center of gravity. The combined effect of these three forces is to raise the body in a vertical direction, and they so balance and neutralize each other that there is no tendency to pitch, or gyratory forces acting eccentric to the center of gravity.

In this specification, the phrase "spring reaches" is employed as a comprehensive term to denote longitudinal members through which the body is supported from the axles and composed wholly or in part of springs. The term, therefore, is to be taken as including a unitary spring as well as a reach composed of a substanially rigid beam to the ends of which are attached springs. It will be understood that when the spring reach is constructed as last described, and as herein shown, the connection between the beam and the springs is a rigid one in the sense that there is no pivotal or other movable connection at this point.

The words "rear", "front", and similar expressions are herein used as convenient illustrative terms, it being obvious that, although the construction shown is preferred for most purposes, the suspension might be oppositely disposed, the pivotal connection between the body and the reaches being in the rear instead of in front of the center of gravity of the body, and the other parts being correspondingly arranged. These and other modifications of the construction shown will, however, be readily apparent to those skilled in the art without further description in detail.

Having thus described my invention, I claim:—

1. In a vehicle having a body and axles, a spring suspension at each side of the body including a spring member having a rocking connection with the body at one side of the centre of gravity thereof, and connected at one end with an axle, said suspension also including a second spring member intermediately supported by the other axle and connected at both ends to the body, said first spring member being connected to said second spring member.

2. In a vehicle having a body and axles, a spring suspension at each side of the body and including a spring member having a connection with the body upon which the latter is free to rock with respect to the former, and a connection at one end with an axle, said suspension including a second spring member supported by another axle and connected at one side of said axle with the body and at the other side of said axle with said first named spring member, one of said spring members being extended beyond their connection and being connected at its end with the body.

3. In a vehicle having a body and axles, a spring suspension at each side of the body and including a spring member having a connection with the body upon which the latter is free to rock with respect to the former, said suspension including a second spring member supported by an axle, said last named spring member being connected at both sides of said axle with the body and at one side of said axle with said first named spring member.

4. In a vehicle having a body and axles, a spring suspension comprising a pair of spring reaches supported at one end upon one of the axles, a connection between said reaches and the body upon which the latter is free to rock with respect to the former, said connection being eccentric to the center of gravity of the body in the direction toward said axle, the adjacent end of the body being free, and springs supported intermediate their ends upon the other axle and connected at both ends with the body, the opposite ends of said reaches being connected with said springs between the adjacent ends of the latter and said last named axle.

5. In a vehicle having a body and axles, a spring reach upon which the body is supported and having a rocking connection with the body, a spring member supported by an axle and connected intermediate its ends to said spring reach, said spring member having a relatively light extension beyond its connection with the spring reach, said extension being connected at its end to the body.

6. In a vehicle having a body and axles, a spring reach connected at one end with an axle and having a rocking connection with the body at one side of its centre of gravity, a spring member supported by the other axle and connected at opposite ends with the body at opposite sides of the axle, and means for connecting said spring reach with said spring member at a point between the axle and one of its connections with the body.

In testimony whereof I affix my signature.

HENRY WEBB HYDE.